United States Patent

Beausoleil et al.

[15] 3,697,962

[45] Oct. 10, 1972

[54] TWO DEVICE MONOLITHIC BIPOLAR MEMORY ARRAY

[72] Inventors: William F. Beausoleil; Irving T. Ho, both of Poughkeepsie; Teh-Sen Jen, Fishkill; W. David Pricer, Poughkeepsie, all of N.Y.

[73] Assignee: International Business Machines Corporation, Armonk, N.Y.

[22] Filed: Nov. 27, 1970

[21] Appl. No.: 92,961

[52] U.S. Cl. ..............................340/173 R, 307/238

[51] Int. Cl. ............................................G11c 11/40

[58] Field of Search ......307/238; 340/173 R, 173 FF

[56] References Cited

UNITED STATES PATENTS

| | | | |
|---|---|---|---|
| 3,581,292 | 5/1971 | Polkinghorn | 340/173 R |
| 3,518,635 | 6/1970 | Cole et al. | 340/173 FF |
| 3,599,180 | 8/1971 | Rubinstein | 340/173 R |
| 3,388,292 | 6/1968 | Burns | 340/173 R |
| 3,513,365 | 5/1970 | Levi | 340/173 R |
| 3,576,571 | 4/1971 | Booher | 340/173 R |
| 3,582,909 | 6/1971 | Booher | 340/173 R |
| 3,593,037 | 7/1971 | Hoff, Jr. | 340/173 R |

*Primary Examiner*—Stanley M. Urynowicz, Jr.
*Attorney*—Hanifin and Jancin and Kenneth R. Stevens

[57] ABSTRACT

This specification discloses a stored charged storage cell for implementation in monolithic memories. The storage cells are fabricated in an array form and are connected to accessing means for reading and writing information into and out of the array. An integrated circuit diffused common sensing line is connected to either selected rows or columns for reading and writing. These sensing lines are connected to a switchable current source. The cell itself clamps the output voltage swing and thus reduces power dissipation. The storage cells each comprise a pair of semiconductor elements for storing digital information on an associated parasitic capacitor. The pair of semiconductor devices are interconnected and operated in an AC mode so as to eliminate direct current paths and thus further prevent unnecessary power dissipation.

19 Claims, 14 Drawing Figures

PATENTED OCT 10 1972 3,697,962

SHEET 1 OF 4

INVENTORS
WILLIAM F. BEAUSOLEIL
IRVING T. HO
TEH-SEN JEN
W. DAVID PRICER
BY Kenneth R. Stevens
ATTORNEY

TWO DEVICE MONOLITHIC BIPOLAR MEMORY ARRAY

RELATED APPLICATIONS

A related application, assigned to the assignee of the present invention is Ser. No. 92,960, filed Nov. 27, 1970, entitled "Bipolar Capacitive Memory Cell," inventor, Siegfried K. Wiedmann.

BACKGROUND OF THE INVENTION

This invention relates to monolithic memories and more particularly to such memories made up of stored charge storage cells, as opposed to bistable storage cells.

In monolithic memories it is desirable to reduce the number of components making up the storage cell so as to reduce processing steps and also to increase densities. In the past, a hook circuit or a silicon-controlled rectifier has been used as a storage element advantageously because of its inherent bi-stability. However, the Hook circuit, as known in the prior art, has many disadvantages when implemented into a storage cell for a monolithic memory array. These circuits are difficult to access, that is, reading and writing in selected cells is difficult to achieve without disturbing the data in the unselected cells. Additionally, these prior art circuits are extremely slow, require a great amount of power, and are not compatible with the requirements of present day monolithic memories, particularly during a write operation.

In accordance with the present invention these difficulties are overcome by employing a unique cell which overcomes the previous problems, while maintaining the simplicity and attendant high density capabilities. Although one embodiment of the present invention somewhat resembles the previously known hook circuit, other equally suitable embodiments employing a memory cell comprising only two devices is part of the present invention.

Essentially, the present invention employs a two-device memory cell which is controlled so as to prevent the cell from latching. Then, instead of using the two-device structure in the bistable mode of operation to store data, data is stored in the cell by applying a data signal which is stored on the parasitic capacitance associated with the two-device cell. Since this type of cell is not inherently bistable, the information must be periodically regenerated. Some of the embodiments only require a single signal to the input device, which serves the two-fold function of turning the input device on and charging the parasitic capacitor.

Therefore, it is an object of the present invention to provide an improved stored charge storage cell.

Another object of the present invention is to provide a stored charge storage cell which is capable of being accessed at extremely high speeds.

Still another object of the present invention is to provide a stored charge storage cell which can be readily implemented in monolithic form with increased densities accompanied by a minimum amount of power dissipation.

Another object of the present invention is to provide a storage cell which can be uniquely fabricated in monolithic form so as to attain a suitably valued parasitic capacitor without affecting the operation of the remaining monolithic circuits.

Accordingly, the present invention provides a stored charged storage cell array in which each storage cell comprises first and second semiconductor devices to store a bit of digital information on an associated parasitic capacitor. Power losses are minimized by interconnecting the cells in an AC mode of operation by eliminating direct current paths. Additional power dissipation is minimized by employing an integrated circuit common sense line which connects to a plurality of cells in either a row or a column and also to a current source drive which is clamped by the cell so as to limit voltage excursions on the common sense line and thus minimize the power loss, $V^2C_{parasitic}$, where V is the output voltage on the common sensing line, and $C_{parasitic}$ is the parasitic capacitance associated with the integrated circuit common sensing line. Finally, in one of the preferred embodiments the value of the parasitic capacitor within the cell itself for storing the information is controlled so as to adequately function as a storage element and also serve as an integral part of the common sensing line in order to economically utilize the silicon area on the semiconductor chip.

DESCRIPTION OF THE DRAWINGS

These and other objects, features and advantages of the invention are more apparent from the following, more particular description of the preferred embodiments of the invention as illustrated in the accompanying drawings of which.

DESCRIPTION OF THE VARIOUS EMBODIMENTS OF THE INVENTION

Figure 1:
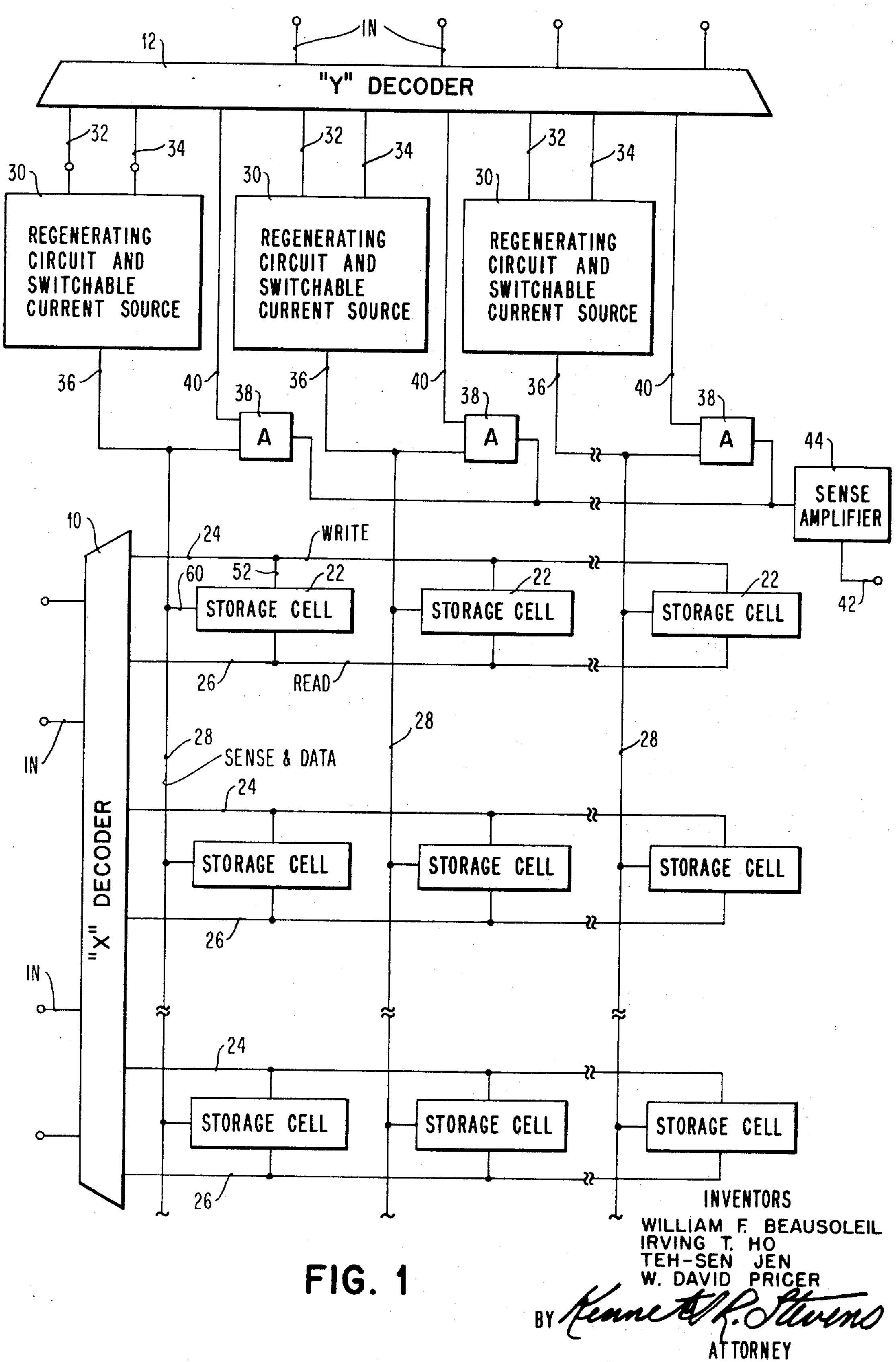
FIG. 1 is an electrical schematic illustrating a plurality of storage cells arranged in an array and includes their interconnection to accessing circuit means.

Now referring to FIG. 1, it illustrates an array of storage cells coupled to suitable accessing means for reading, writing and regenerating digital information into the array. In order to select a particular cell and control the accessing of information, an X decoder 10 and a Y decoder 12 are adapted to receive a plurality of decode signals on their respective input terminals designated IN. A plurality of storage cells are each designated at 22. Each row of storage cells is interconnected to write and read lines 24 and 26, respectively, which in turn are connected to the decoder 10 output lines.

In the Y direction, each column of memory cells is connected to a respective common sensing line 28. Each common sensing line 28 receives the stored signal or information from a storage cell during a read operation. Associated with each column of storage cells is a regenerating and switchable current source 30. The regenerating circuits 30 are each controlled by a pair of input signals which are received on lines 32 and 34 connected from the output of the Y decoder 12 to the inputs of each circuit 30. A selected regenerating circuit 30 delivers an output signal on its associated output line 36. Each line 36 is in turn connected to its respective common sensing line 28 and as an input connection to an associated AND gate 38.

During a read operation, a single AND gate is gated on to select a single column in response to the signal on its associated line 36 in conjunction with an enabling signal received at line 40. Thus, the output terminals from the decoder 12 selectively generates control signals on line 36 by operation of a selected regenerating circuit 30, and also provides a gating signal to one of the AND gates 38 via line 40. Accordingly, a single storage cell is selected by the decoders 10 and 12, and its signals state is transmitted to an output terminal 42 by a selected AND gate 38, each of which is connected to an output sense amplifier 44.

As will be described later in greater detail with reference to FIG. 9, each of the regenerating circuits 30 also function as a switchable constant current source during a read operation so as to minimize power dissipation on the selected common sense line 28. In one monolithic version, the common sense lines 28 are constituted by diffused lines and as a result they contain parasitic capacitance associated therewith. Large voltage excursions, V, on the common sensing lines 28 would normally result in unnecessary power dissipation due to $V^2C_{parasitic}$ losses. To avoid this problem, a self-contained constant current source drive within each of the regenerating circuits 30 is clamped by the selected cell so as to limit the voltage excursions, V.

Like reference numerals are employed in FIG. 1 to designate different elements and interconnections which function in an identical manner for purposes of clarity, rather than designating each and every element with a different reference numeral. Moreover, one preferred embodiment storage cell is described with reference to FIG. 2 and 2a which may be directly incorporated into the array of FIG. 1. Thereafter, there is described modifications of other storage cell embodiments. Some of these later described embodiments require an additional control line, however, their implementation into the system array of FIG. 1 is a simple modification to a worker in the art.

THE STORAGE CELL OF FIG. 2

This stored charge storage cell comprises a first input semiconductor device comprising a PNP transistor 50. The emitter of PNP transistor 50 is connected via line 52 to the row or write line 24. The cell further comprises an interconnected second semiconductor device consisting of an NPN transistor 54. The emitter terminal of the transistor 54 is connected to the row or read line 26 via line 56. The collector terminal of transistor 50 is connected to the base terminal of transistor 54 via line 58. Finally, the base terminal transistor 50 and the collector terminal of transistor 54 are interconnected to the common sensing line 28 by way of line 60.

In this preferred embodiment, information is stored in the cell on parasitic capacitor 62. In order to distinguish the capacitor from a conventional discrete element it is shown in phantom or dashed lines. As will be described below with reference to FIG. 8, parasitic capacitor 62 represents modified base-to-collector parasitic capacitance.

For optimal operation of the storage cell it has been found that the leakage current of the circuit should be maintained below 20 nanoamperes at operating temperature. Also, the beta gain of the PNP transistor 50 is selected greater than 0.01, while the beta gain of NPN transistor 54 is selected as: 100 > beta > 20.

OPERATION-STORAGE CELL OF FIG. 2

With reference to FIG. **2*a*, a write 0 operation is performed by activating the write line 24 and the line 60 which is connected to the common sensing line 28. Line 24 is raised approximately +3.0 volts while simultaneously maintaining line 28 at approximately +3.0 volts. The base to emitter junction of PNP transistor 50 is reversed biased and thus remains non-conductive. Therefore, no charge is stored on the parasitic capacitor 62** and this condition represents the writing of a binary 0.

In order to write a binary 1, the line 24 is raised to approximately +3.0 volts while the line 28 is lowered from approximately +3.0 volts to +2.3 volts. As a result, PNP transistor 50 conducts and capacitor 62 is charged to a positive level of approximately +2.8 volts, mainly due to the collector to emitter current flowing through PNP transistor 50. Accordingly, a binary 1 is stored in the cell. During the write 1 operation, the emitter of NPN transistor 54 is at approximately +3.0 volts and its base is at approximately +2.8 volts. Thus the base to emitter junction of NPN transistor 54 is reverse biased and this transistor is in a non-conductive state. Similarly, during the write 0 operation, the base to emitter junction of transistor 54 is reversed biased and therefore transistor 54 is nonconductive, and thus transistor 50 is also nonconductive. In this manner, no DC path exists between lines 24 and 26, and, therefore, the storage cell operates entirely in an AC mode. The absence of a direct current path minimizes power losses so as to enable the storage cell to be implemented in monolithic form in much greater densities.

In order to read information from the cell, the read line 26 is lowered from approximately +3.0 volts to 0.0 volts. If a binary 1 is stored in the parasitic capacitor 62, the base of transistor 54 will be positively bias with respect to its emitter and thus transistor 54 is conductive. The charge stored on capacitor 62 is discharged through the base-emitter junction of transistor 54 in a destructive read-out manner. This current is amplified by the transistor 54 in order to generate an output voltage level of approximately +2.3 volts on the common sensing line 28 which is representative of a binary 1. On the other hand, with a binary 0 stored on the parasitic capacitor 62, the transistor 54 remains non-conductive because its base-emitter junction is not sufficiently forwardly biased and thus a voltage level of approximately +3.0 volts is maintained at the collector of transistor 54 via the connection 60 from the common sensing line 28. This is schematically represented by the dashed line of approximately +3.0 volts on line 28 under the read 1 time period. Thus, in this particular embodiment, a binary 1 is represented by an output voltage of approximately +2.3 volts on line 28, and a binary 0 is represented by the voltage level of approximately +3.0 volts on line 28. The destructive mode of operation is demonstrated by the voltage curve for capacitor 62 wherein the voltage on node or line 58 decreases exponentially from a value of approximately +2.8 volts to +0.7 volts when going from write 1 to a read 1 sequence.

It thus can be seen that transistor 50 functions as an AND gate to coincident signals on line 24 and 28. Moreover, the signal on line 24 also serves as the charging signal for the parasitic capacitor 62. Similarly, transistor 54 serves broadly as an AND gate, i.e., responsive to the control signal on line 26 and the charge on node or line 58. In addition, transistor 54 provides an amplifying function in that the charge stored on the parasitic capacitor 62 is discharged through its base emitter diode and amplified by its current gain (beta) so as to deliver an output signal to the common sensing line 28.

STORAGE CELL FIG. 3

Figure 2:
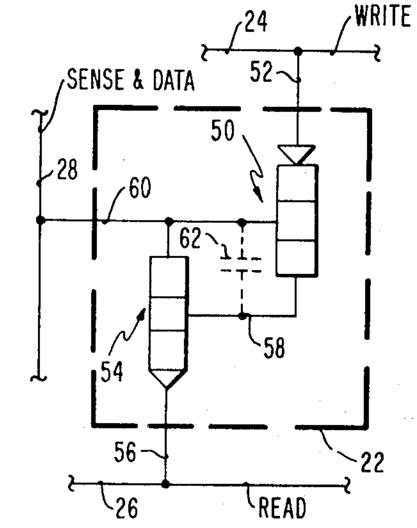
FIG. 2 illustrates a preferred embodiment of a two device storage cell, lateral PNP and NPN transistors, which can be used in the array of FIG. 1.
Figure 3:
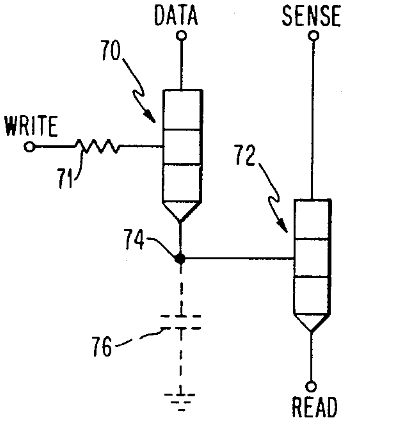

FIG. 3 represents a similar two-device storage cell which comprises an input NPN transistor 70 interconnected to an output NPN transistor 72. The version in FIG. 3 requires an additional control terminal to the input transistor in contrast to the cell of FIG. 2, which uses a common sense and data line. In this version, the base of transistor 70 is connected to a write line via a small biasing resistor 71, and its collector is connected to a data line. The emitter of transistor 70 is connected to the base of output transistor 72 at node 74. A parasitic capacitor 76 exists between the node 74 and some fixed potential and is employed to store digital information. As in the previous embodiment of FIG. 2, the output transistor 72 includes separate sense and read lines.

This cell configuration differs from that in FIG. 2 in that its operation is based on inverse transistor action. That is, during a write 0 operation it is necessary to discharge the parasitic capacitor 76, if a 1 had previously been stored therein. In order to accomplish this destructive read-out, the base to collector junction of transistor 70 operates as a base to emitter junction so as to rapidly discharge the parasitic capacitor 76.

During a write 0 operation, the write line first is raised to the value of approximately +3.0 volts from 0.0 volts, thus bringing the write line to +0.7 volts. In addition, the voltage signal on the data line is applied so as to overlap the signal applied on the write line. In this manner, the binary 1 previously stored on the parasitic capacitor 74, typically +2.3 volts for the illustrative signal levels, is discharged to approximately 0.2 volts through the inverse transistor action of transistor 70. Accordingly, the NPN-NPN storage cell version is rendered operative by selecting transistor 70 to have an inverse beta gain, and selecting voltage levels so as to insure that its base to collector diode is forward biased during the write 0 operation.

It can be seen that the cell operates in a similar manner to that previously described with reference to FIG. 2. During a write 1 operation the transistor 70 is conductive so as to charge the parasitic capacitor 74. Also, transistor 72 remains nonconductive during the write 1 operation so as to eliminate any direct current path between the data and the read line. Likewise, the read operation is controlled by applying a signal to the read line which is connected to the emitter of transistor 72 so as to generate an output signal on the sense line connected to its collector terminal. A binary 1 is represented by a voltage level of approximately +2.3 volts and a binary 0 is represented by an output voltage level on the sense line of approximately +3.0 volts.

The specific monolithic implementation of the storage cell of FIG. 3 is not described, however, it can be readily implemented using well known techniques similar to that described below in connection with the implementation of the cell of FIG. 2. Since the parasitic capacitor 76 is located differently than that shown in connection with the storage cell of FIG. 2, its monolithic implementation is not identical. A separate diffusion or a silicon dioxide layer in the monolithic implementation of the FIG. 3 cell can be employed so as to add capacitance to the node 74 in order to insure a sufficiently valued capacitor 76 for storing the information.

STORAGE CELL—FIG. 4

Figure 4:
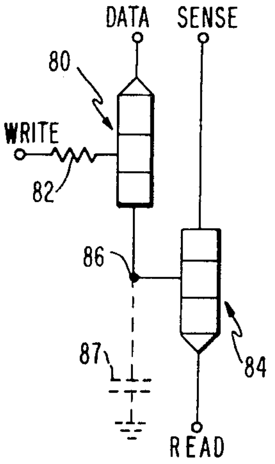

In FIG. 4, an all NPN version of the stored charge storage cell is illustrated. The storage cell comprises an input transistor 80 having a write line connected to its base, and a data line connected to its emitter. In order to insure proper switching of the input transistor 80, a small resistor 82 may be connected to its base. An NPN output transistor 84, as previously described, performs a read and amplifying function. The base of transistor 84 is connected to the collector of transistor 80 at node 86. The collector of transistor 84 is connected to a sense line, and its emitter is connected to a read line. An intrinsic parasitic capacitor 87 exists between the node 86 and a fixed potential. This parasitic capacitor represents the collector to substrate capacitance of transistor 80 when implemented in monolithic form according to conventional fabrication techniques. The typical value of capacitor 87 is usually large enough to function as a storage element. However, when desired, the value of capacitance 87 between node 86 and ground can be increased by enlarging the collector area or by separate monolithic processes or diffusion steps.

In operation, this small all NPN version is different than that described with reference to FIG. 3 in that capacitor 87 may be discharged by conventional transistor action. The overall accessing operation of the cell is similar to that previously described and can be explained with reference to FIG. 3*a*. In writing a binary 0, input transistor 80 is rendered conductive by the application of write and data signals so as to charge the capacitor 87 to a level slightly above ground potential or approximately +0.2 volts, in one specific monolithic implementation. The transistor 84 remains nonconductive during this write 0 operation. In a write 1 operation, the base-emitter junction of transistor 80 is reverse biased because the data line is now lowered with respect to the base potential. Therefore, the parasitic capacitor 87 is charged by way of node 86 to a value of approximately +2.3 volts due to the voltage generated at node 86.

The reading of a binary 1 or binary 0 from the cell of FIG. 4 is similar to that previously described in that the transistor 84 is rendered conductive during a binary 1 read operation so as to generate a voltage of approximately +2.3 volts at the sense line. Similarly, the sense line will remain at approximately +3.0 volts when reading a binary 0 because transistor 84 is non-conductive.

STORAGE CELL — FIG. 5

Figure 5:
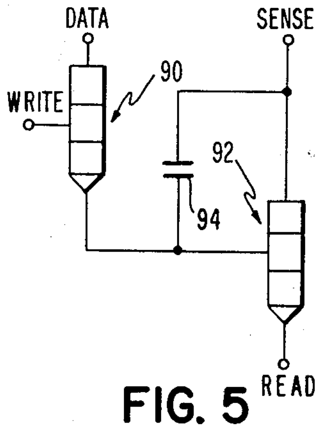

Another all NPN version of a storage cell is illustrated in FIG. 5. This storage cell comprises an input NPN transistor 90 having a write and a data line connected to its base and collector respectively. The emitter of transistor 90 is connected to the base of output NPN transistor 92, and also includes a read line and sense line connected to its emitter and collector, respectively. In this instance, the parasitic capacitor is monolithically present between the base and collector terminals of transistor 92, designated at 94.

The operation of the cell in FIG. 5 is virtually identical to that previously described with reference to FIGS. 3 and 3a. However, in this embodiment the parasitic capacitor 94 is connected between the base and collector terminal of transistor 92, and, therefore, its monolithic counterpart is found in parasitic capacitor 62 connected between the base and collector terminals of transistor 54, FIG. 2. Its value can be controlled in a similar manner to that described with reference to the monolithic implementation of the storage cell of FIG. 2.

STORAGE CELL — FIG. 6

Figure 6:
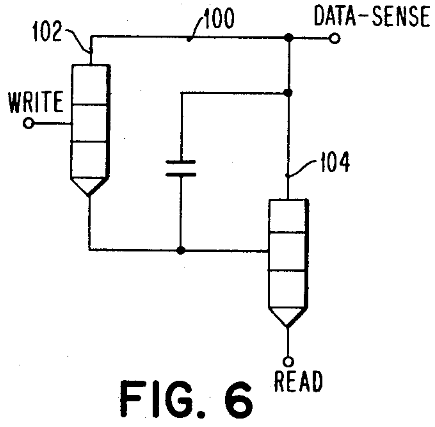

An all NPN storage cell version is shown in FIG. 6 and is essentially the counterpart of that described in FIG. 5. Thus, the operation of the cells described in FIGS. 5 and 6 are virtually identical to the storage cell of FIG. 3, as depicted in the voltage diagram of FIG. 3a. The distinction of this version is that the data and sense lines are combined to form a single line 100. In monolithic form, this allows for increased density in that separate diffused lines are no longer required to the respective collectors of the input and output transistors. On the other hand, some flexibility is sacrificed in that the range of voltage levels which are applied to collector terminals 102 and 104 must be selected to be mutually compatible. This all NPN version is significant because it allows for maximum densities without requiring complementary devices to be fabricated in monolithic form.

STORAGE CELL — FIG. 7

Figure 7:
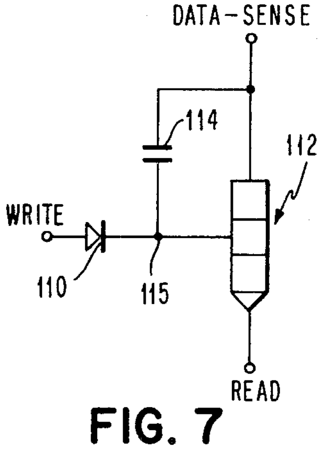

FIG. 7 illustrates another embodiment of the two-device storage cell wherein the input device is replaced by a diode 110 instead of a transistor as was described in the other embodiments. The output device comprises an NPN transistor 112. A write line is connected to the anode of diode 110, and the cathode of diode 110 is connected to the base terminal of transistor 112, and its value is controlled in a similar manner to that previously described. Read and data sense lines are connected to the emitter and collector terminals of transistor 112, respectively.

Figure 7A:
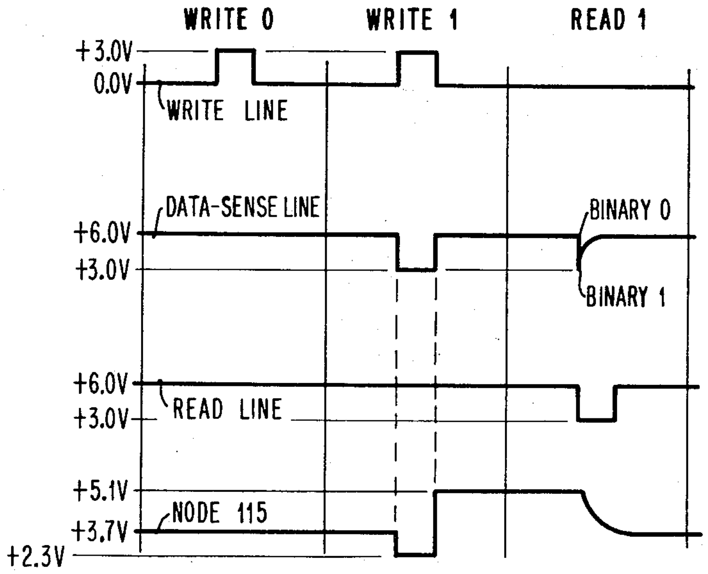

FIG. 7*a* shows that the storage cell operation is similar to that previously described except that the voltage levels on the data-sense line, read line, and parasitic capacitor 114 are slightly different, due to the fact that the input transistor is replaced by a diode.

Figure 2A:
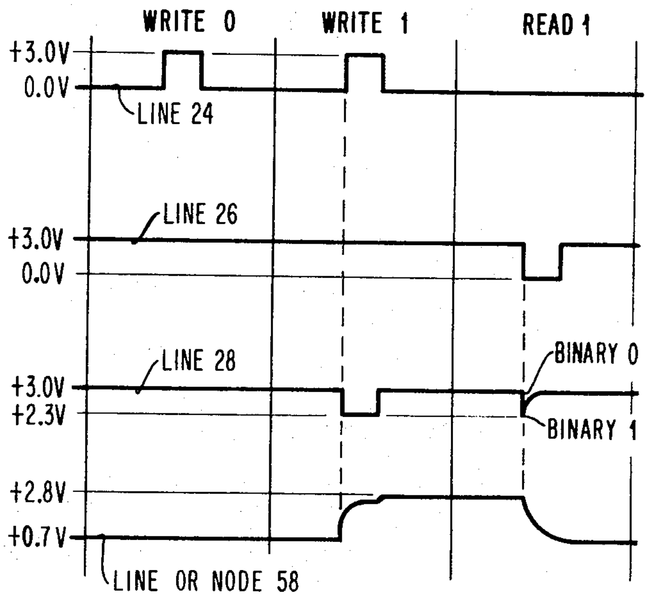
FIG. 2*a* illustrates typical voltage levels used to access the cell of FIG. 2, FIGS. 3–7 show other embodiments of the two-device storage cells and illustrate different structural interconnections of other combinations of PNP-NPN, NPN-NPN, or diode-NPN devices which also are suitable for implementation into the array described in FIG. 1, and FIGS. 3*a* and 7*a* illustrate typical voltage levels used to access the storage cells of FIGS. 3 and 7, respectively.
Figure 3A:
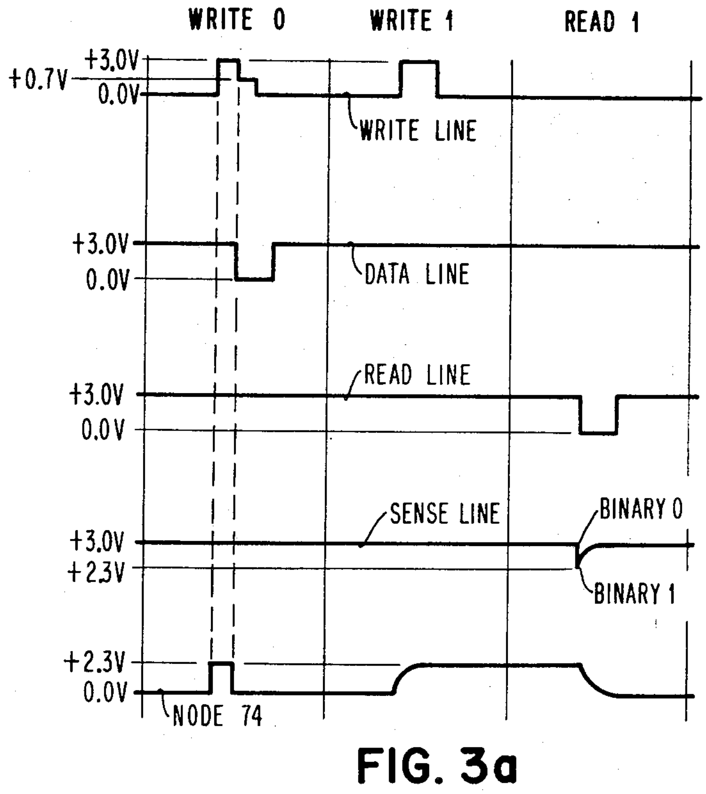

In all of the voltage level accessing schematics of FIGS. 2*a*, 3*a*, and 7*a*, the typical signal levels are separately shown for both a write 0 and a write 1 operation. However, in the read 1 illustration, as it relates to the voltage level at the parasitic capacitor node, the schematics depict the sequential writing and reading of a binary 1 and the accompanying discharge of the capacitor node. The voltage level on the output sensing line for a binary 0 is represented by a dotted line, but it is to be understood that the parasitic capacitor node voltage curves only are shown for a read 1 operation.

STORAGE CELL — FIG. 2 MONOLITHIC IMPLEMENTATION

Figure 8:
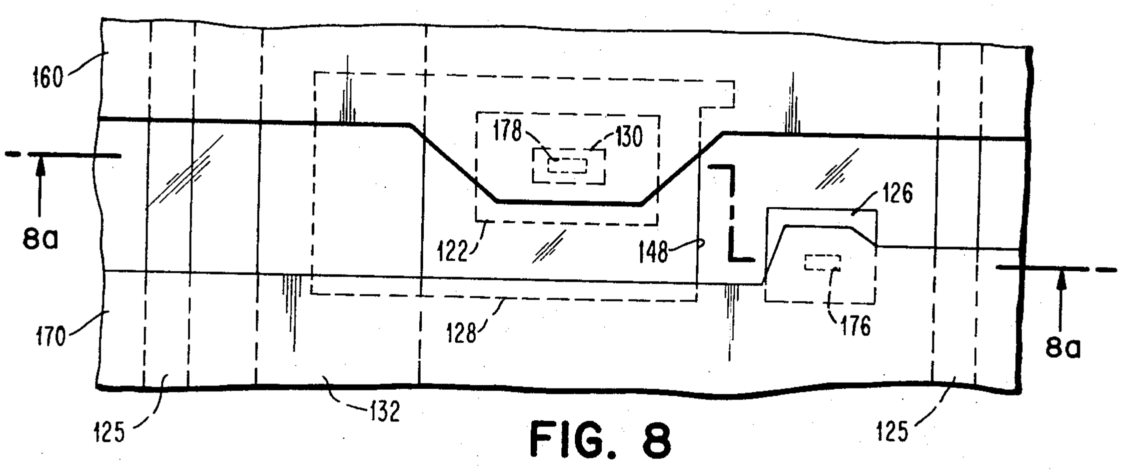
FIG. 8 illustrates a monolithic implementation of the cell of FIG. 2.
Figure 8A:
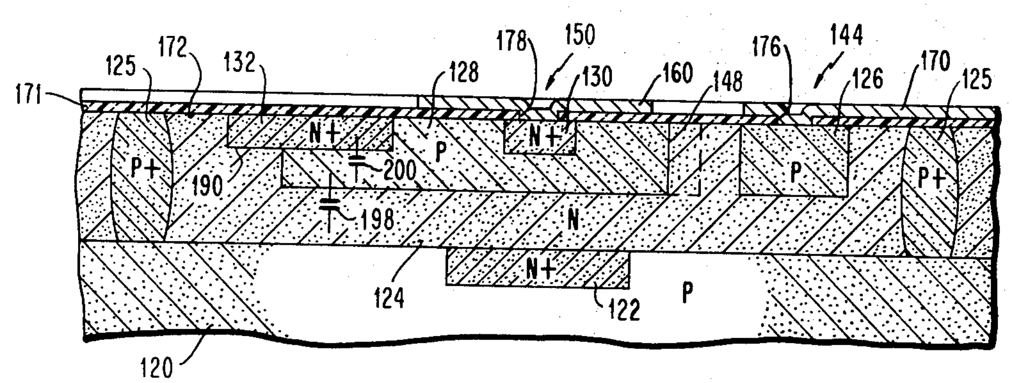
FIG. 8*a* is a partial cross-sectional view of FIG. 8 taken along lines 8*a*—8*a*.
Figure 8B:
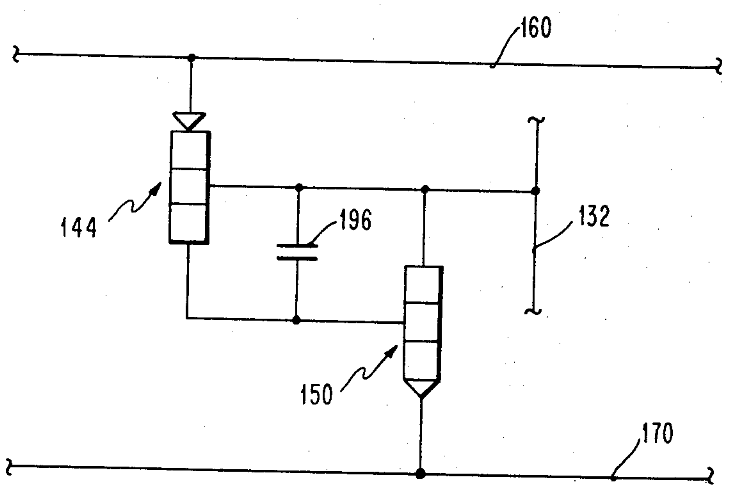
FIG. 8*b* is an electrical schematic identical to the cell of FIG. 2 and is repeated for convenience of association with its monolithic counterpart.

FIGS. 8, 8*a*, and 8*b* illustrate one manner of implementating the storage cell of FIG. 2 into a monolithic form. The electrical schematic version of the storage cell of FIG. 2 is redepicted in FIG. 8*b* and relabeled to correspond with its monolithic version for ease of reference.

This NPN-PNP version of a storage cell is formed on a P-type substrate 120. Using conventional monolithic fabrication techniques an N+ subcollector 122 is formed in the substrate 120. Next, an N-type epitaxial layer 124 is grown over the P-type substrate 120. Next, a diffusion step is employed to form a pair of P+ regions 125 in order to electrically isolate the storage cell. Thereafter, a P-type diffusion, using an appropriate mask configuration, is used to simultaneously form P regions 126 and 128. Then, an N+ diffusion is employed to simultaneously form regions 130 and 132.

The input PNP transistor 144, FIG. 8*b*, is thus constituted by the P region 126 which serves as its emitter, and N portion 124 which serves as its base, so as to form a base to collector junction 148 with the P region 128.

The NPN transistor 150, FIG. 8*b*, is constituted by an N+ subcollector region 122 and collector region 124, a P-type base region 152, and the N+ emitter region 130.

A write line 160 and a read line 170 are then formed by providing separate metallization lines over the cells. The metallization lines are formed in a conventional manner by forming a silicon dioxide layer 171 over the surface 172 of the device and then forming contact openings for the various terminals of the transistor devices 144 and 150. Contact opening 176 is formed to contact the emitter 126 of the PNP transistor 144, and a contact opening 178 is formed through the oxide to contact the emitter 130 of NPN transistor 150. Thereafter, metallization lines, such as aluminum, deposited at 160 and 170.

Prior to the formation of the metallization lines 160 and 170, an N+ diffusion is employed to form diffused strip 132. The diffused strip 132 serves a multifunction purpose. Firstly, diffused strip 132 provides a lower electrical impedance connection to the collector of transistor 150 at its extreme left hand portion and contacts the N collector region in the area designated by 190. Further, the right-hand portion of diffused strip 132 provides a lower electrical impedance connection to the base of transistor 144 since P region 128 is also the base of transistor 144.

The parasitic capacitor schematically shown as 196, FIG. 8*b*, normally is represented by the monolithic capacitor comprising the junction between the P region 128 and the N epitaxial region 124. This is electrically represented in FIG. 8*a* by capacitor 198. In addition, it can be seen that the N+ diffused region 132 also serves another function in that it creates another monolithic capacitor at the N+ and P junction formed by diffused region 132 and the P region 128, and is schematically represented by capacitor 200. Thus, the monolithic equivalent of parasitic capacitor 196 is actually constituted by parasitic capacitors 198 and 200. Thus, in this monolithic version of a complementary PNP and NPN monolithic cell, a highly desirable result is obtained. The monolithic organization provides a cell which only requires one level of metallurgy due to the location of the N+ low resistivity diffused strip 132 and the overlying metallization lines 160 and 170. This result is achieved without a sacrifice in density; and moreover, the N+ diffused strip 132 provides an additional parasitic capacitor for aiding the storage of digital information.

Figure 9:
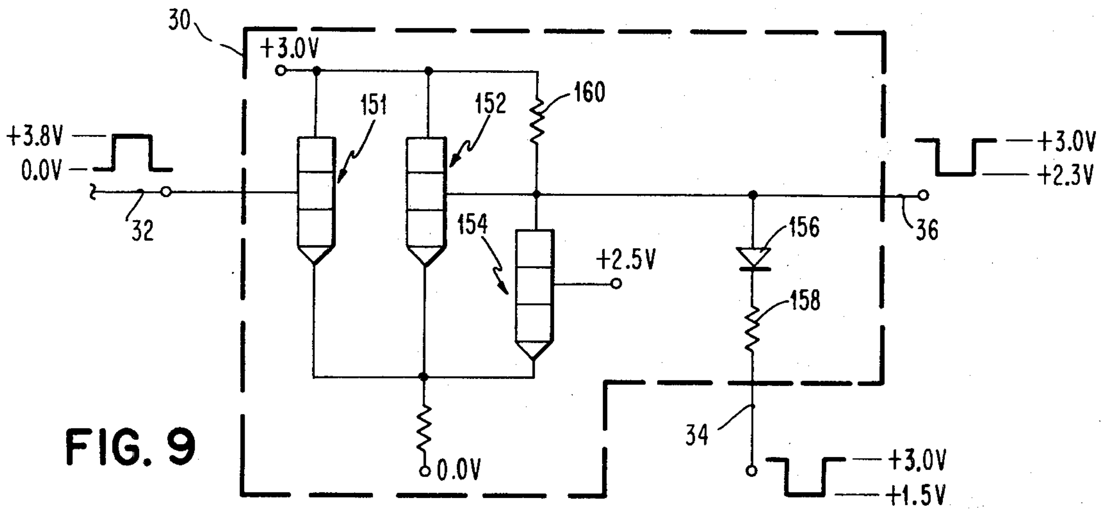

FIG. 9 illustrates the specifics of the regeneration circuit 30 employed for accessing the cell of FIG. 2, as incorporated in the array of FIG. 1. A typical regeneration circuit 30 receives input signals at lines 32 and 34 from the Y decoder 12. The regeneration circuit 30 operates to generate a signal at an output line 36 of approximately either +2.3 volts or +3 volts, depending upon the input signals received on lines 32 and 34. A pair of transistors 151 and 152 are differentially connected between voltage sources of +3.0 volts and −0.0 volts. A reference transistor 154 is connected to transistor 152 and to the output line 36. The base of transistor 154 is maintained at a reference voltage of approximately +2.5 volts. The output line 36 is connected to a clamping arrangement comprising a diode 156 and a resistor 158 having a value of approximately 4.7 kilo-ohms.

The regeneration circuit functions to control the reading and writing operations, and also operates to regenerate the information in a storage cell after a destructive read operation. Line 32 is typically adapted to receive a control pulse varying between 0.0 volts and +3.8 volts. Line 34 is adapted to receive a control pulse between +3.0 volts and +1.5 volts.

During a destructive read 0 and a rewrite 0 operation, line 32 is raised to approximately +3.8 volts. Current is thus flowing through conductive transistor 151 and transistor 152 is non-conductive. With transistor 152 in a nonconductive state, transistor 154 is also nonconductive because its emitter voltage is at a relatively high potential with respect to its base reference potential. During this operation line 36 is at +3.0 volts and thus the output line 36 is also at approximately +3.0 volts. As can be seen in FIG. 2, this satisfies the condition that the common sense line 28 be held at approximately +3.0 volts during a write 0 operation.

Similarly, during a write or rewrite 1 operation, the line 32 is lowered substantially below 3.8 volts and line 34 is also lowered to 1.5 volts or lower. Transistors 151 and 152 are thus rendered nonconductive and transistor 154 conductive. Now, however, current also flows through a load resistor 160 connected to the collector of transistor 154 by virtue of the fact that line 34 is at a lower potential. The drop in potential across resistor 160 is effective to turn transistor 154 to a conductive state so as to generate an output pulse of approximately +2.3 volts at the output line 36. Transistor 154 acts as a clamp circuit to insure that the voltage at the output line 36 does not drop substantially below +2.3 volts. Thus, the regeneration circuit 30 satisfies the voltage level condition that the common sense line 28 be at approximately +2.3 volts during a write 1 operation, as previously described with reference to FIG. 2*a*. Accordingly, the regeneration circuit in conjunction with the X and Y decoders 10 and 12 are employed for regenerating information into a storage cell after a read operation as well as during the initial write accessing cycle. Further, the regeneration circuit can be controlled in the write 0 mode of operation so as to reset itself, that is, to place the output sense line at the +3.0 volt level after a read operation. Naturally, the regenerating circuit 30 is operated in conjunction with appropriate control signals on lines 24 and 26, as controlled by the X decoder 10.

While the invention has been particularly shown and described with reference to the particular embodiment thereof, it will be understood by those skilled in the art that the foregoing and other changes in form and detail may be made therein without departing from the spirit and scope thereof.

What is claimed is:

1. A stored charge storage cell array for a monolithic memory comprising:

a. a plurality of storage cells for storing digital information, the plurality of storage cells being connected to an output terminal means for receiving the stored digital information, b. accessing means connected to the plurality of storage cells for writing the digital information into the plurality of storage cells and for reading the digital information from the plurality of storage cells for reception by the output terminal, c. each of the plurality of storage cells comprising first bipolar and second bipolar interconnected semiconductor devices, the first and second interconnected devices having a parasitic capacitor associated therewith for storing a bit of digital information, d. a common sensing line connected to the output terminal means and to the second device, e. a first input terminal connected to the first device for receiving a write signal, and the parasitic capacitor being charged by the write signal to a first binary state in response to the application of a write signal of a first voltage level, f. the parasitic capacitor being placed in a second binary state in response to the application of the write signal of a second voltage level, g. each of the second devices including a control terminal adapted to receive read control signals, h. the second device being responsive to a read control signal so as to discharge the binary signal representative of a first binary signal from its associated parasitic capacitor, the discharge signal being amplified by the beta gain of the second device so as to generate a read output signal on the common sensing line representative of a first binary signal, i. the first and second devices being interconnected between the first input terminal of the first device and the control terminal of the second device, so as to present a direct electrical path between the first input terminal of the first device and the control terminal of the second device, the direct electrical path being constituted by at least a portion of the first device and a portion of the second device, and j. the first and second devices being responsive to the write and read control signals such that at least one of the first or second devices in a cell is non-conductive during storage cell operation in order to eliminate direct power dissipation losses.

2. A stored charge storage cell array for a monolithic memory comprising:

a. a plurality of storage cells for storing digital information, the plurality of storage cells being connected to an output terminal means for receiving the stored digital information, b. accessing means connected to the plurality of storage cells for writing the digital information into the plurality of storage cells and for reading the digital information from the plurality of storage cells for reception by the output terminal, c. each of the plurality of storage cells comprising first and second interconnected semiconductor devices, the first and second interconnected devices having a parasitic capacitor associated therewith for storing a bit of digital information, d. a common sensing line connected to the output terminal means and to the second device, e. a first input terminal connected to the first device for receiving a write signal, and the parasitic capacitor being charged by the write signal to a first binary state in response to the application of a write signal of a first voltage level, f. the parasitic capacitor being placed in a second binary state in response to the application of the write signal of a second voltage level, g. each of the second devices including a control terminal adapted to receive read control signals, h. the second device being responsive to a read control signal so as to discharge the binary signal representative of a first binary signal from its associated parasitic capacitor, the discharge signal being amplified by the beta gain of the second device so as to generate a read output signal on the common sensing line representative of a first binary signal, i. a substrate for supporting the plurality of monolithic storage cells, j. the second device of each cell being constituted by a monolithic transistor formed on the substrate and having base, emitter and collector regions, a portion of the parasitic capacitor being constituted by the monolithic collector-substrate capacitance of the second device, k. the common sensing line being connected to the collector regions of the second device transistors for providing an output signal, l. the common sensing line being a diffused monolithic line having a relatively low resistivity, m. a portion of the common sensing line being located within the base regions of the second device transistors so as to form a first junction comprised by a base region of one conductivity type and a diffused monolithic line of opposite conductivity type, n. the first junction constituting an additional parasitic capacitor in each cell and adding to the collector-base parasitic capacitor for forming a cumulative parasitic capacitor, and o. the cumulative capacitor being responsive to store the write signal representative of a first binary state.

3. A stored charge storage cell array for a monolithic memory as in claim 1 wherein:

a. the second device is constituted by a transistor having base, emitter, and collector terminals, and b. the common sensing line being connected to the collector terminals of the second device transistors.

4. A stored charge storage cell array for a monolithic memory as in claim 1 wherein:

a. the accessing means include orthogonal decoders for providing decoder control signals, b. regenerating means being connected at its output to an associated common sensing line in a row or column of the storage cell array and to the orthogonal decoders, c. the regenerating means being responsive to the decoder control signals for conditioning a selected common sensing line during either a write operation, or during a read-regenerating operation.

5. A stored charge storage cell array for a monolithic memory as in claim 4 wherein:

a. the regenerating circuit means further includes a switchable current source energized in response to decoder control signals during a read operation, and b. a selected storage cell, in conjunction with its associated switchable current source, being operative to clamp the output voltage swing on a common sensing line during a read operation so as to reduce power dissipation losses.

6. A stored charge storage cell array for a monolithic memory as in claim 1 further comprising:

a. a substrate for supporting the plurality of monolithic storage cells, b. the second device of each cell being constituted by a monolithic transistor formed on the substrate and having base, emitter and collector regions, a portion of the parasitic capacitor being constituted by the monolithic collector-substrate capacitance of the second device, c. the common sensing line being connected to the collector regions of the second device transistors for providing an output signal, d. the common sensing line being a diffused monolithic line having a relatively low resistivity, e. a portion of the common sensing line being located within the base regions of the second device transistors so as to form a first junction comprised by a base region of one conductivity type and a diffused monolithic line of opposite conductivity type, f. the first junction constituting an additional parasitic capacitor in each cell and adding to the collector-base parasitic capacitor for forming a cumulative parasitic capacitor, g. the cumulative capacitor being responsive to store the write signal representative of a first binary state, and h. the first semiconductor devices of each cell being constituted by monolithic transistors formed on the substrate.

7. A stored charge storage cell array for a monolithic memory as in claim 2 wherein:

a. the second device transistors of each cell are NPN types, and the common sensing line is an N+ diffused region.

8. A stored charge storage cell array for a monolithic memory as in claim 6 wherein:

a. the first semiconductor devices of each cell comprises a PNP transistor having base, emitter, and collector regions, b. the first input terminal connected to the first device for receiving a write signal being connected to the emitter region of the PNP transistor, c. the base region of the PNP transistor being connected to the collector region of the second device and to the common sensing line and, the collector region of the PNP transistor being connected to the base region of the second device.

9. A stored charge storage cell array for a monolithic memory as in claim 6 wherein:

a. the first semiconductor device of each cell comprises an NPN transistor having base, collector and emitter regions, b. the first input terminal connected to the first semiconductor device for receiving a write signal being connected to the base region of the first NPN semiconductor device, c. the collector region of the first NPN semiconductor device being adapted to receive a data signal, d. the emitter region of the first NPN semiconductor device being connected to the base region of the second semiconductor device transistor, and e. the first NPN semiconductor transistor being operated in an inverse transistor mode for discharging the parasitic capacitor during a read operation.

10. A stored charge storage cell array for a monolithic memory as in claim 6 wherein:

a. the first semiconductor device comprises an NPN transistor having base, collector, and emitter regions, b. the first input terminal connected to the first semiconductor device for receiving a write signal being connected to the base region of the first NPN semiconductor device, c. the emitter region of the first NPN semiconductor device being adapted to receive a data signal, and d. the collector region of the first NPN semiconductor device being connected to the base region of the second semiconductor transistor device.

11. A stored charge storage cell array for a monolithic memory as in claim 9 further including:

a. a common node connected to the emitter region of the first NPN semiconductor device and to the base region of the second semiconductor device, and b. the parasitic capacitor being electrically connected at one of its terminals to the common node and at its other terminal to a fixed reference potential.

12. A stored charge storage cell array for a monolithic memory as in claim 9 wherein:

a. the emitter region of the first NPN semiconductor device is connected to the base region of the second semiconductor device, and b. the parasitic capacitor is electrically connected between the base and collector regions of the second semiconductor device.

13. A stored charge storage cell array for a monolithic memory as in claim 6 wherein:

a. the first semiconductor device is constituted by a unilateral conducting device, b. the unilateral conducting device being connected to the base region of the second device, c. the first input terminal connected to the first device for receiving a write signal being connected to the unilateral conducting device, and d. the parasitic capacitor being electrically connected between the base and collector regions of the second semiconductor device.

14. A stored charge storage cell array for a monolithic memory as in claim 8 wherein:

a. the second device monolithic transistors of each cell are of NPN conductivity.

15. A stored charge storage cell array for a monolithic memory as in claim 9 wherein:

a. the second device monolithic transistors of each cell are of NPN conductivity.

16. A stored charge storage cell array for a monolithic memory as in claim 10 wherein:

a. the second device monolithic transistors of each cell are of NPN conductivity.

17. A stored charge storage cell array for a monolithic memory as in claim 11 wherein:

a. the second device monolithic transistors of each cell are of NPN conductivity.

18. A stored charge storage cell array for a monolithic memory as in claim 12 wherein:

a. the second device monolithic transistors of each cell are of NPN conductivity.

19. A stored charge storage cell array for a monolithic memory as in claim 13 wherein:

a. the second device monolithic transistors of each cell are of NPN conductivity.

* * * * *